United States Patent [19]
Benzoni

[11] Patent Number: 5,042,889
[45] Date of Patent: Aug. 27, 1991

[54] MAGNETIC ACTIVATION MECHANISM FOR AN OPTICAL SWITCH

[75] Inventor: Albert M. Benzoni, Lower Macungie Township, Lehigh County, Pa.

[73] Assignee: AT&T Bell Laboratories

[21] Appl. No.: 506,310

[22] Filed: Apr. 9, 1990

[51] Int. Cl.[5] .............................................. G02B 6/26
[52] U.S. Cl. .................................................. 385/16
[58] Field of Search ............................ 350/96.16, 96.2

[56] References Cited

U.S. PATENT DOCUMENTS

| | | | |
|---|---|---|---|
| 4,057,719 | 11/1977 | Lewis | 250/227 |
| 4,303,303 | 12/1981 | Aoyama | 350/96.20 |
| 4,376,566 | 3/1983 | Blackington | 350/96.2 |
| 4,512,627 | 4/1985 | Archer et al. | 350/96.20 |
| 4,580,873 | 4/1986 | Levinson | 350/96.2 |
| 4,607,161 | 8/1986 | Anderson et al. | 250/227 |
| 4,790,621 | 12/1988 | Calaby et al. | 350/96.2 |
| 4,932,745 | 6/1990 | Blonder | 350/96.16 |

FOREIGN PATENT DOCUMENTS

| | | | |
|---|---|---|---|
| 0130505 | 10/1980 | Japan | 350/96.2 |

OTHER PUBLICATIONS

"Optical Bypass Switch for Fiber-Optic Data Bus Systems", Nunoshita et al., Applied Optics, vol. 19, No. 15, Aug. 1, 1980, pp. 2574-2576.

Primary Examiner—John D. Lee
Assistant Examiner—Stephen W. Barns
Attorney, Agent, or Firm—W. W. Koba

[57] ABSTRACT

An activation mechanism for an optical switch is disclosed. The mechanism is particularly suited for use with switches requiring the movement of a reflecting element into and out of an optical signal path to provide switching. The mechanism consists of a reflecting element (e.g., mirror) and a means (e.g., magnetic, electrostatic, vacuum) for moving the reflecting element into and out of the optical signal path. In the absence of any applied signal, the reflecting element is positioned to intercept an optical signal and redirect it into the chosen output signal path. Upon the application of an external signal, the moving means will create a force of a strength sufficient to move the mirror and allow the optical signal to pass through the switch unobstructed by the reflecting element.

17 Claims, 4 Drawing Sheets

MAGNETIC ACTIVATION MECHANISM FOR AN OPTICAL SWITCH

BACKGROUND OF THE INVENTION

1. Field of the Invention

The present invention relates to an activation mechanism for an optical switch and, more particularly, to a mechanism for moving a reflecting element into or out of an optical signal path between waveguides so as to provide switching of optical signals between pairs of waveguides.

2. Description of the Prior Art

In evolving optical communication networks, the need often arises to switch an optical signal from one path to another. For example, in a network which consists of a number of communication nodes connected sequentially to form a ring, it may be required to temporarily remove one or more nodes from the network. Therefore, the optical waveguides (e.g., fibers) interconnecting the network must be able to "switch" the node(s) from an active (transmit/receive) state to a passive (bypass) state. Many arrangements exist in the art for providing this type of switching. The arrangements may be generally classified into two groups: (1) moving beam switches (arrangements which redirect the optical signal path between stationary waveguides); and (2) moving fiber switches (designs which use an external force to physically change the location of optical fibers entering and exiting the node). The activation mechanism of the present invention is utilized with switches of the former design.

An exemplary optical fiber switch utilizing a moving mirror to perform the switching function is disclosed in U.S. Pat. No. 4,580,873, issued to F. H. Levinson on Apr. 8, 1986. In the Levinson matrix switch, a plurality of mirrors are positioned at the crosspoints of the input and output nodes. As disclosed, a silicon switch substrate is etched to include regions at each crosspoint for holding a rotatable mirror assembly. The application of an electrical signal to individual mirror elements performs the switching function. Although such a switching arrangement may be practical for large array applications, the details of the silicon substrate fabrication process become increasingly time-consuming and expensive for single switch applications.

A remaining need in these and other existing systems is the ability to reduce the overall size, cost, manufacturability and power consumption of the switch.

SUMMARY OF THE INVENTION

The need remaining in the prior art is addressed by the present invention which relates to an activation mechanism for an optical switch and, more particularly, to means for moving a reflecting element into or out of an optical signal path between waveguides so as to provide switching of optical signals between pairs of waveguides.

In general, the present invention relates to an activation mechanism comprising a reflecting element which, in a first position, redirects optical signals between pairs of optical waveguides. In a second position, the reflecting element is removed from the signal path so that the optical signals may pass through the switch unobstructed. The activation mechanism includes moving means located in close proximity to the reflecting element for providing a force (e.g., electrostatic, magnetic, vacuum) capable of moving the reflecting element towards the moving means and out of the optical signal path. For optical bypass switch applications, as will be discussed in detail below, the "first position" of the reflecting elements is usually used as the bypass state of the switch, and the "second position" is used as the active state of the switch.

In accordance with a particular embodiment of the present invention, an electromagnetic device is utilized as the moving means and is positioned in close proximity to the reflecting element. A portion of the surface of the reflecting element near the electromagnetic device is coated with a ferromagnetic material (with a high magnetic permeability) to effect the attraction of the reflecting element to the electromagnetic moving means. In the absence of an applied electrical signal, the electromagnetic device is dormant and the reflecting element is positioned so as to intercept and redirect optical signals (first, redirecting position). Upon the application of an electrical signal to the electromagnet, a magnetic field is created which is of a sufficient strength to attract the ferromagnetic material on the reflecting element and move the element out of the optical signal path (second, attracted position) so as to allow the optical signals to pass through the switch unobstructed by the reflecting element.

As an additional feature of the present invention, a spring member may be positioned on the reflecting element to aid in securing the reflecting element in the redirecting position. The spring element is of a force which does not interfere with the operation of the moving means, yet may speed the return of the reflecting element to its redirecting position when the external signal is removed and the moving means is deactivated.

An advantage of the activation mechanism of the present invention is that the mechanism is totally encased and may be located above (or below) the set of optical waveguides such that no additional surface area beyond the substrate holding the waveguides is required.

Another advantage of the activation mechanism of the present invention is that the gap separating the reflecting element and the moving means may be made extremely small (e.g., on the order of 10 mils), so that the force (and hence, the external electric power) required to lift the reflecting element is reduced. The reduction in air gap size also serves to decrease the overall size of the switch. Further, a particular embodiment of the present invention utilizes housing for the moving means including a number of support pins. The support pins are positioned so as to inherently provide for a well-defined, reproducible and tightly toleranced air gap separating the two members.

Various other embodiments, features and advantages of the present invention will become apparent during the following discussion and by reference to the accompanying drawings.

BRIEF DESCRIPTION OF THE DRAWING

Referring now to the drawings, where like numerals represent like parts in several views.

DETAILED DESCRIPTION

In the general operation of the present invention, the reflecting element is positioned in the optical signal path (first, redirecting position) so as to redirect signals between appropriate input and output optical waveguides. Upon the application of an external force, the reflecting element is removed from the signal path (second, attracted position) so that the optical waves propagate unobstructed. In accordance with the teachings of the present invention, the external force may be electrostatic, vacuum, magnetic, or any other type of force suitable for providing motion of the reflecting element in response to an applied signal.

Figure 1:
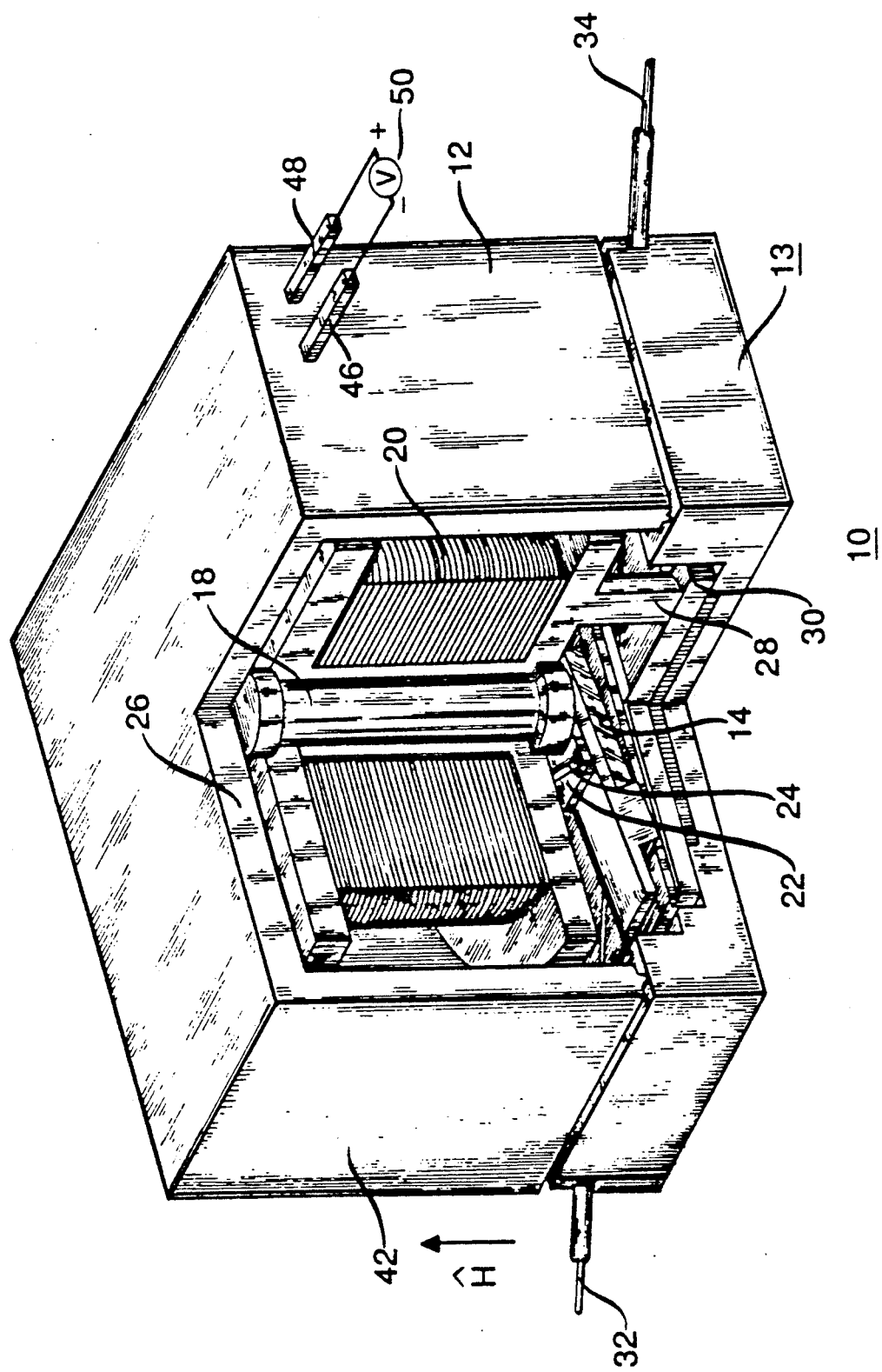
FIG. 1 illustrates a cut away view of an exemplary optical switch utilizing an exemplary electromagnet-based activation mechanism of the present invention.

An exemplary optical fiber switch 10 including an exemplary electromagnetic-based activation mechanism 12 of the present invention is illustrated in FIG. 1. The portion of the switch holding the actual fibers, referred to as a switch substrate 13, is illustrated more clearly in FIG. 2 and will be described in detail below. It is to be understood that the use of the activation mechanism of the present invention is not limited to fiber-based optical switches, but is generally applicable to switch optical signals traveling along any type of optical waveguide. As used herein, the term "optical waveguide" is deemed to encompass not only integrated waveguides formed within an optical substrate, but also optical fibers, or in general any media capable of supporting the transport of an optical signal. Additionally, an exemplary switch utilizing the activation mechanism of the present invention may use any desired combination of optical fibers and integrated waveguides. It is to be noted that the following discussion describes a particular embodiment of the present invention which utilizes a magnetically-controlled activation mechanism. As discussed above, other types of control arrangements (e.g., electrostatic, vacuum) may also be used.

Returning to FIG. 1, switch 10 includes an activation mechanism 12 which functions to move a reflecting element 14 out of its redirecting position upon application of an electrical signal. In particular, activation mechanism 12 includes an electromagnetic 16 comprising a ferromagnetic core 18 and a wire coil 20 which is wound around core 18. A. is well known in the art, the application of an electrical signal (i.e., voltage) to coil 20 will create a magnetic field intensity, denoted H, in the direction illustrated in FIG. 1. In accordance with the teachings of the present invention, at least a portion surface of reflecting element 14 located in proximity to core 18 is coated with a ferromagnetic material 22 which will be attracted to core 18 in the presence of the induced field H. As will be discussed below in association with FIG. 2, the magnetic field functions to attract reflecting element 14, moving element 14 out of the optical signal path. The attracted position of switch 10 is illustrated in FIG. 1, where communication is unobstructed between an incoming fiber 32 and an outgoing fiber 34. As can be seen by reference to FIG. 1, only the slightest raising is required (for example, 10 mils) to effectively remove reflecting element 14 from the signal path.

A spring member 24, illustrated in FIG. 1 (shown more clearly in FIG. 4), may be used to maintain reflecting element 14 in the redirecting position and thus prevent "bouncing" of element 14 in the absence of magnetic field intensity H (i.e., applied voltage). As mentioned above, the spring force is such that reflecting element 14 remains motionless in the redirecting position, yet is insufficient to interfere with the operation of electromagnet 16.

In an alternative vacuum-controlled embodiment of the activation mechanism of the present invention, ferromagnetic core 18 described above may be replaced by a hollow tube, connected to a vacuum source. Therefore, upon the activation of the vacuum source, the force of the vacuum will attract the reflecting element towards the hollow tube.

Figure 3:
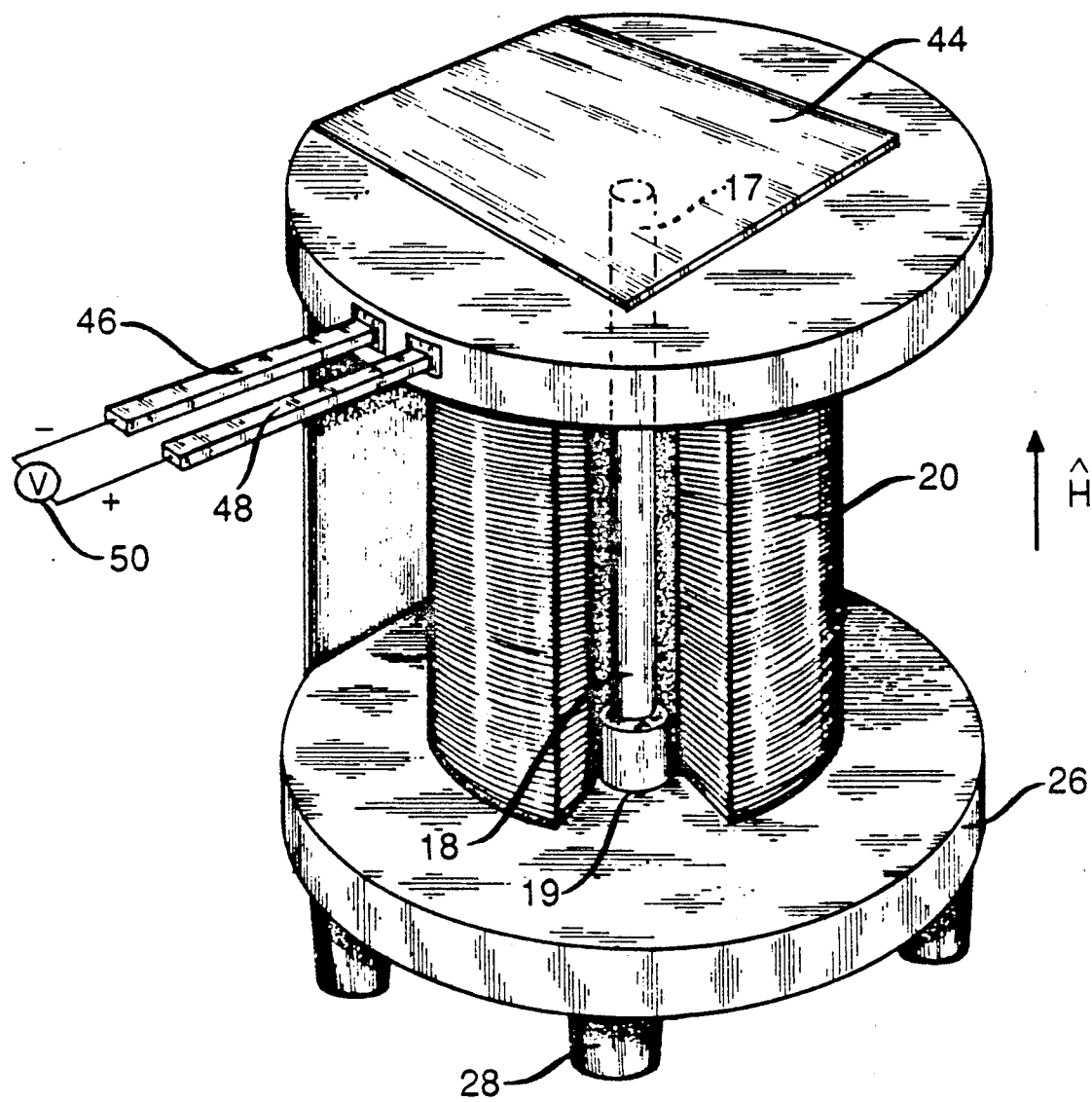
FIG. 3 contains a detailed illustration of an exemplary activation mechanism formed in accordance with the present invention.

In packaging activation mechanism 12 with switch 10, the embodiment of FIG. 1 illustrates coil 20 being wound on a bobbin 26, with ferromagnetic core 18 being positioned in a central opening through bobbin 26. As shown, bobbin 26 includes a set of pins 28 which serve to support bobbin 26 in a fixed and stable position above switch substrate 13. As mentioned above, the dimensions (height) of the pins will also serve to determine the air gap separating ferromagnetic core 18 and ferromagnetic material 22. Advantageously, the air gap will then be a well-controlled and reproducible quantity. A detailed illustration of an exemplary electromagnet 16, including bobbin 26, is shown in FIG. 3. As will be discussed in detail hereinafter, bobbin 26 may also be formed to include the necessary electrical connections between coil 20 and the external power supply. Bobbin 26 may be formed of any suitable material, including silicon, plastic or ceramic.

Figure 2:
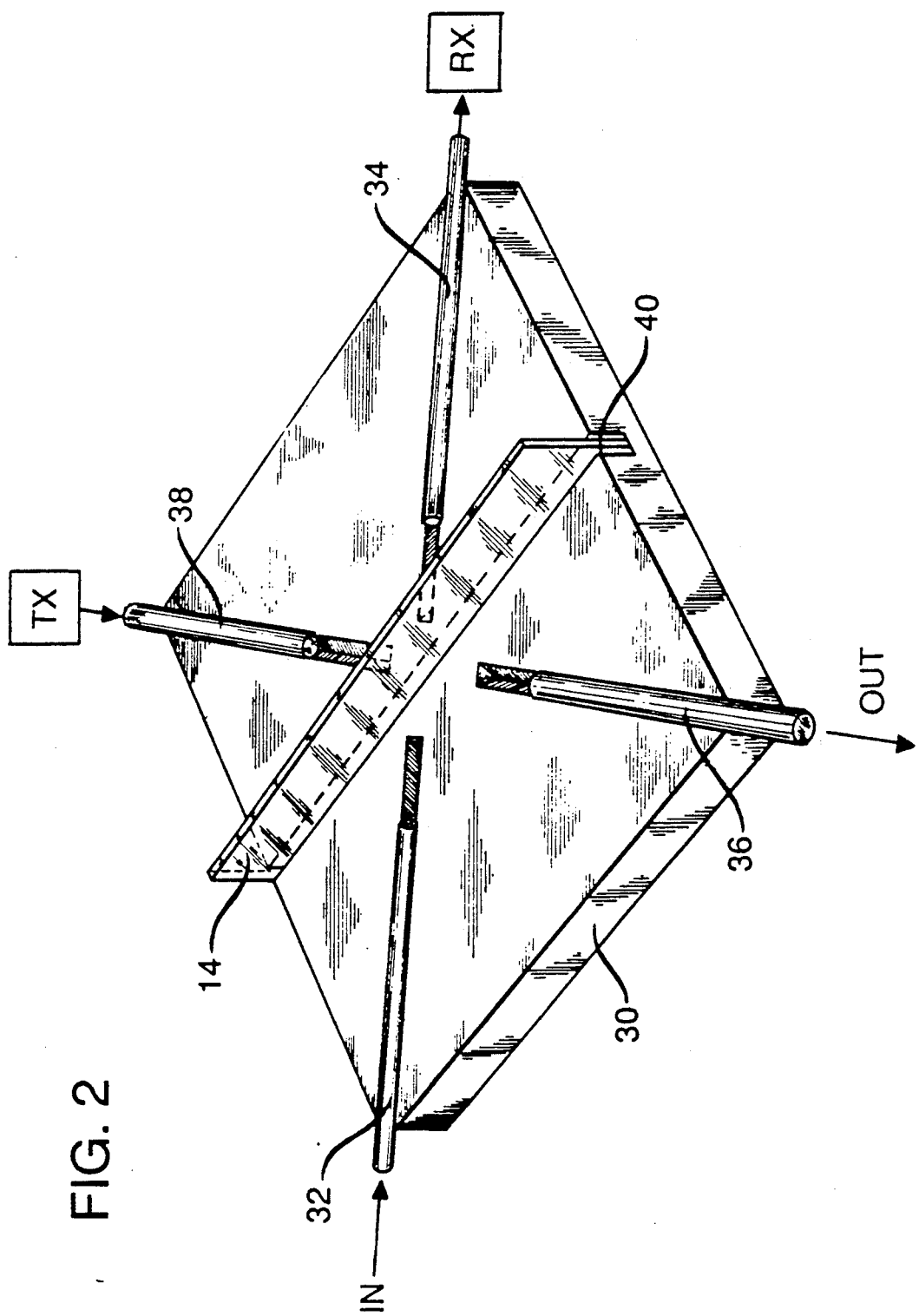
FIG. 2 illustrates in detail the substrate portion of an exemplary optical fiber switch which may utilize the activation mechanism of the present invention.

An exemplary switch substrate 13 which may utilize the activation mechanism of the present invention is illustrated in FIG. 2. In this particular application, the switch is utilized to connect a local user (referred to as a node) to a communication network. It is to be noted that there exist other uses for such a switch, such as in a laser sparing operation where it is desired to disconnect a first signal source and connect a second signal source to an outgoing communication fiber. The activation mechanism of the present invention is not considered to be dependent upon the particular use of the fiber switch. For example, the activation mechanism of the present invention may also be used with a multiple switch array, where large numbers of optical signals may be switched simultaneously during a single operation of the activation means. Various ones of these different switching embodiments are described in detail in a copending application entitled "Radiation Switching Arrangement with Moving Deflective Element", Ser. No. 385,331, filed July 25, 1989, now U.S. Pat. No. 4,932,745 assigned to the assignee of this invention and herein incorporated by reference.

In the particular embodiment illustrated in FIG. 2, a silicon substrate 30 is formed to hold a set of four fibers, including a fiber 32 which delivers the incoming optical signal through switch 10 to the node, a fiber 36 which delivers the outgoing signal from the node to the network, a fiber 34 coupled to the receiver portion of the node, and a fiber 38 which is coupled to the transmit portion of the node. The following discussion will describe the two positions (redirecting and attracted) of the exemplary switch. For the particular discussion, the redirecting position will be defined as the bypass state (where the node is removed from the network) and the attracted position will be defined as the active state (where the node is in communication with the network). With respect to the bypass state, the reflecting element is positioned as controlled by the activation mechanism such that the incoming optical signal will be intercepted and redirected into the outgoing fiber. Referring to FIG. 2, the signal is thus redirected from incoming fiber 32 into outgoing fiber 36 by inserting a reflecting element 14 (e.g., mirror), as shown in phantom, in slot 40 of substrate 30. Separate lensing elements may be used to maximize the coupled power of the signal. In general, both sides of element 14 upon which an optical signal may impinge contain a reflective coating. Therefore, the signal exiting fiber 38 (from the node transmitting device) may also be redirected by reflecting element 14 into fiber 34 associated with the node receiving device. Advantageously, the loopback of the local signal may be used by the node to perform maintenance operations on its local communication system during bypass conditions. The configuration as described is defined as the "redirecting" or "bypass" state of the switch. In accordance with the teachings of the present invention, it is preferred to utilize the unenergized state of the activation mechanism to define the bypass state, since a power failure at the node would thus automatically disconnect from the network.

In most cases, it is desired to have the node in communication with the network. In accordance with the teachings of the present invention, this active state of the switch is achieved by energizing the activation mechanism so as to attract the reflecting element and remove it from the optical signal path. Referring to FIG. 2, if element 14 is removed from the signal path, the incoming signal along fiber 32 will then be launched into fiber 34 which is coupled to the node's receiver. The node transmitter is then used to launch a message signal into transmit fiber 38 which, in the absence of element 14, will pass unobstructed into outgoing fiber 36. The signal from the node transmitter is then returned via fiber 36 to the network. As mentioned above, a detailed description of the operation of this particular switch may be had by reviewing the above-referenced application. With this explanation of the operation of switch 10, various components visible in FIG. 1 may now be identified, including incoming fiber 32, receiver fiber 34 and groove 40.

An exemplary electromagnet 16 portion of an activation mechanism formed in accordance with the present invention is illustrated in FIG. 3. For the sake of clarity, outer housing 42 of FIG. 1 has been removed so that the internal portions of electromagnet 16 are clearly visible. As discussed above, electromagnet 16 is energized by an external power supply 50 so as to raise reflecting element 14 in the presence of a magnetic field. Electromagnet 16 comprises ferromagnetic core 18, for example, an iron alloy core, which is inserted through an opening in bobbin 26. As mentioned above, bobbin 26 may comprise any suitable material, plastic being considered as the most economical alternative. A number of pins 28 may also be formed as part of bobbin 26 and disposed as shown in FIG. 3. Pins 28 are utilized to hold electromagnet 16 in a fixed position relative to the switch substrate such that the air gap separating reflecting element 14 and electromagnet 16 is precisely determined. A return path 44, comprising a sheet of ferromagnetic material, is disposed as shown in FIG. 3 and formed to contact top face 17 and approach (but not contact) bottom face 19 of core 18. The combination of core 18, ferromagnetic material 22 and return path 44 thus forms a complete ferromagnetic loop. Coil 20 is wound, as illustrated in FIG. 3, around bobbin 26 so as to encircle core 18. The wire forming coil 20 is attached, as shown, to a pair of electrical leads 46, 48 for connection to external power supply 50.

In operation, when power supply 50 is turned on, the voltage V applied between leads 46 and 48 results in the flow of current through coil 20. As is well-known, the flow of a current in a coil wound around a ferromagnetic material will result in the creation of a magnetic field, illustrated as H. The strength of the magnetic field is thus a function of the level of the current, the number of turns of coil 20, and the selected materials.

Figure 4:
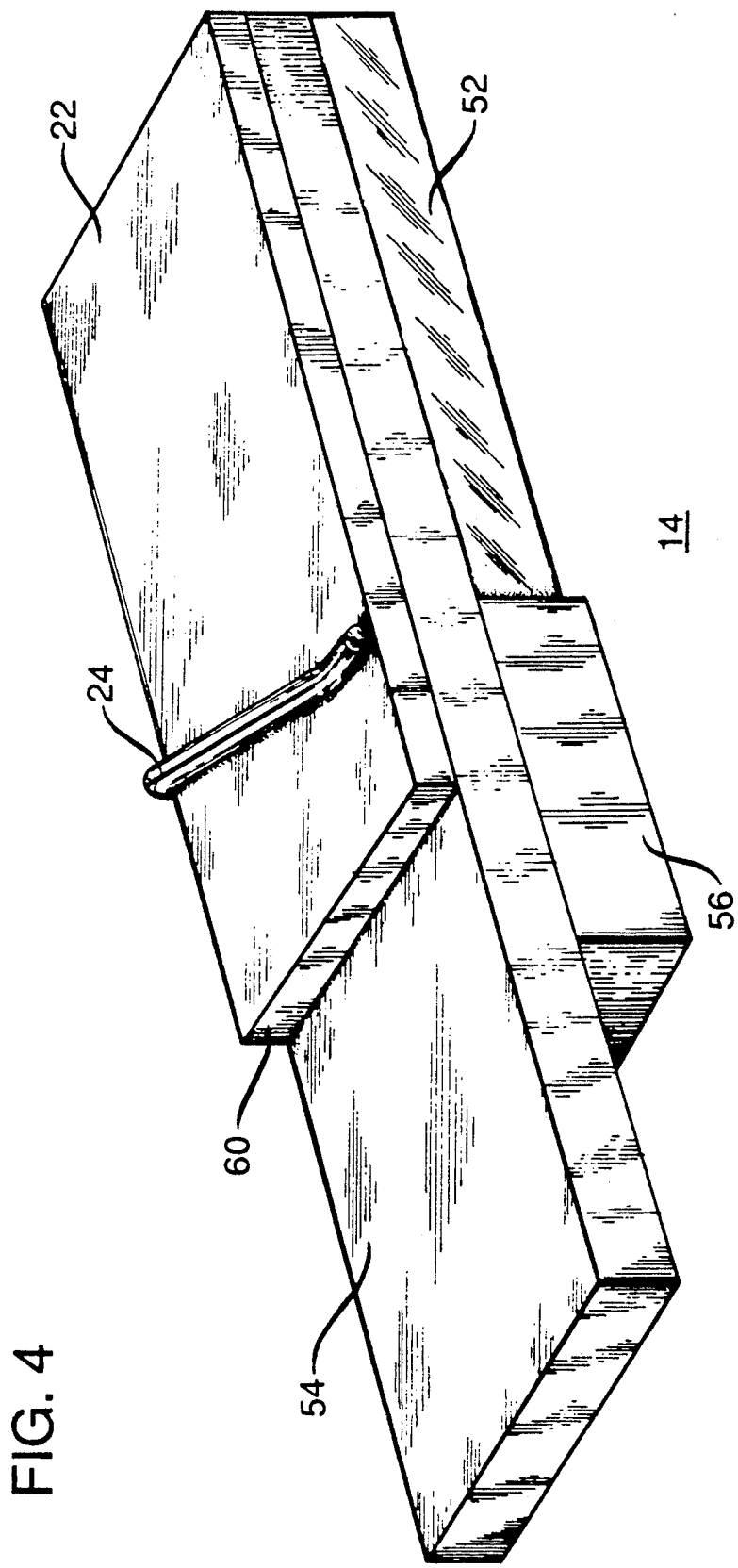
FIG. 4 contains a detailed illustration of an exemplary reflecting element formed in accordance with the present invention.

FIG. 4 illustrates an exemplary reflecting element 14, which with electromagnet 16 of FIG. 3, forms an activation mechanism 12 as illustrated in FIG. 1. Referring to FIG. 4, reflecting element 14 includes a mirror component 52 which performs the actual optical signal redirection. Mirror component 52 may comprise a section of mirrored glass or, alternatively, a section of silicon which has been processed to include suitable reflective coatings. Various other types of components may be used to form mirror 52. As shown, mirror component 52 is attached to (or formed as an integral part of) a support element 54 which is designed to maintain mirror component 52 in the required position in the optical signal path. For the particular embodiment illustrated in FIG. 4, support element 54 includes a pivot arm 56 which provides for movement of mirror component 52 in the illustrated direction upon activation of electromagnet 16. Support element 54 may further include, in association with the switch substrate, a number of registration markers 58 to facilitate alignment of reflecting element 14 with the switch substrate (not shown). A ferromagnetic material 22 is attached to top surface 60 of support element 54, as illustrated in FIG. 4, so as to be substantially underneath the position of electromagnet 16 relative to element 54. The thickness and extent of material 22 are sized according to many various design factors, including spring force, magnetic field intensity, switching time, etc.

As mentioned above, reflecting element 14 may further comprise a spring member 24, positioned as shown with respect to element 14 to aid in securing reflecting element 14 within the slot (redirecting position) of the switch substrate (illustrated in previous figures). End 62 of spring 24 is fixed within the housing (not shown) to provide the required rigidity. In operation, spring 24 is used to apply a relatively light force to top surface 60 of element 54, so as to maintain support element 54 properly aligned and reduce bounce, when electromagnet 16 is not activated.

It is to be understood that the above-described embodiments are merely illustrative of the teachings of the present invention and should not be considered to limit the scope of the inventive activation mechanism. For example, the activation mechanism of the present invention may be utilized to provide switching between a plurality of separate optical signals, such as in a 3×3 switch array as disclosed in the above-referenced co-pending application. Additionally, the activation mechanism of the present invention may be used to simultaneously move a number of separate reflecting elements, each element associated with a different switch. Further, the switch itself is not necessarily limited to a fiber-based arrangement, where the activation mechanism of the present invention may also be used with a switch comprising a number of waveguides formed in an optical substrate, where the reflecting element of the inventive activation mechanism is disposed in a groove in the optical substrate. Lastly, as mentioned above, the switching mechanism itself is not considered to be limited to electromagnet-based embodiments, where there exist other means which are capable of providing the same motion of the reflecting element relative to the switch substrate.

What is claimed is:

1. In an optical bypass switch utilizing a reflecting element to redirect optical signals between a number of different communication paths, an activation mechanism for providing the redirection of optical signals, the activation mechanism comprising a reflecting element including a coating of magnetic material for redirecting optical signals between first pairs of signal paths when disposed in a first, redirecting position and for passing optical signals between second, alternate pairs of signal paths when in a second, attracted position; and electromagnetic control means disposed in close proximity to the reflecting element for attracting the magnetic coating and thereby moving the reflecting element parallel to itself into and out of the optical signal path.

2. An optical bypass switch as defined in claim 1 wherein the electromagnetic control means comprises a bobbin including a hollow core region;

a wire coil wound around the bobbin, the coil including a sufficient number of turns to provide the desired magnetic field;

a ferromagnetic core disposed within the hollow core region of the bobbin, the core defined as having first and second endfaces formed to be relatively flush with the bobbin;

a ferromagnetic return path surrounding a portion of the bobbin so as to contact the first endface of the core; and electrical connection means coupled to the first and second ends of the wire coil for connecting the wire coil to an external power supply.

3. An optical bypass switch as defined in claim 2 wherein the bobbin further includes a plurality of pins for supporting the electromagnetic control means a predetermined distance above the reflecting element.

4. An optical bypass switch as defined in claim 2 wherein the bobbin comprises a plastic material.

5. An optical bypass switch as defined in claim 2 wherein the ferromagnetic core and ferromagnetic return path comprise an iron alloy.

6. An optical bypass switch as defined in claim 2 wherein the reflecting element comprises:

a mirror for providing the optical signal redirection path; and a mirror support element for holding the mirror in the optical signal redirection path.

7. An optical bypass switch as defined in claim 6 wherein the reflecting element further comprises a pivot arm for controlling the motion of said reflecting element.

8. An optical bypass switch as defined in claim 6 wherein the reflecting element further comprises a plurality of registration markers for facilitating alignment of said reflecting element with the communication paths.

9. An optical bypass switch as defined in claim 6 wherein the reflecting element further comprises a spring member capable of maintaining the mirror in a fixed location in the optical signal redirecting position, the spring force insufficient to negate the attraction of the electromagnetic control means.

10. An optical bypass switch as defined in claim 6 wherein the mirror support element comprises silicon.

11. An optical bypass switch as defined in claim 1 wherein the reflecting element comprises a single reflecting component.

12. An optical bypass switch as defined in claim 1 wherein the reflecting element comprises a plurality of reflecting components simultaneously activated by the electromagnetic control means.

13. An optical bypass switch as defined in claim 1 wherein the electromagnetic control means further comprises a plurality of pins for supporting the electromagnetic control means a predetermined distance above the reflecting element.

14. An optical bypass switch as defined in claim 1 wherein the reflecting element further comprises a mirror for providing the optical signal redirection path; and a mirror support element for holding the mirror in the optical signal redirection path.

15. An optical bypass switch as defined in claim 1 wherein the reflecting element further comprises a pivot arm for controlling the motion of said reflecting element.

16. An optical bypass switch as defined in claim 1 wherein the reflecting element further comprises a plurality of registration markers for facilitating alignment of said reflecting element with the communication paths.

17. An optical bypass switch as defined in claim 1 wherein the reflecting element further comprises a spring member capable of maintaining the reflecting element in a fixed location in the optical signal redirecting path, the spring force insufficient to negate the attraction of the electromagnetic control means.

* * * * *